US010618467B2

(12) United States Patent
Jeon et al.

(10) Patent No.: US 10,618,467 B2
(45) Date of Patent: Apr. 14, 2020

(54) STEREO IMAGE GENERATING METHOD USING MONO CAMERAS IN VEHICLE AND PROVIDING METHOD FOR OMNIDIRECTIONAL IMAGE INCLUDING DISTANCE INFORMATION IN VEHICLE

(71) Applicant: RESEARCH & BUSINESS FOUNDATION SUNGKYUNKWAN UNIVERSITY, Suwon-si (KR)

(72) Inventors: Jae Wook Jeon, Suwon-si (KR); Sang Jun Lee, Suwon-si (KR); Jin Young Byun, Suwon-si (KR); Byung Oh Jo, Suwon-si (KR); Seong Wook Jang, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 21 days.

(21) Appl. No.: 15/466,254

(22) Filed: Mar. 22, 2017

(65) Prior Publication Data
US 2017/0280063 A1    Sep. 28, 2017

(30) Foreign Application Priority Data

Mar. 22, 2016 (KR) .......................... 10-2016-0033806

(51) Int. Cl.
| | |
|---|---|
| *B60R 1/00* | (2006.01) |
| *H04N 13/00* | (2018.01) |
| *G06K 9/00* | (2006.01) |
| *H04N 5/232* | (2006.01) |
| *H04N 5/247* | (2006.01) |
| *H04N 13/243* | (2018.01) |

(52) U.S. Cl.
CPC ............ *B60R 1/00* (2013.01); *G06K 9/00791* (2013.01); *G06K 9/00805* (2013.01); *H04N 5/23238* (2013.01); *H04N 5/247* (2013.01); *H04N 13/243* (2018.05); *B60R 2300/105* (2013.01); *B60R 2300/301* (2013.01); *B60R 2300/303* (2013.01)

(58) Field of Classification Search
CPC ..... B60R 1/00; H04N 13/243; G06K 9/00791
USPC ......................................... 348/38
See application file for complete search history.

(56) References Cited

U.S. PATENT DOCUMENTS

2008/0147253 A1* 6/2008 Breed ................... B60W 30/16
701/3
2014/0114534 A1* 4/2014 Zhang ....................... B60R 1/00
701/42

(Continued)

*Primary Examiner* — Jeffery A Williams
(74) *Attorney, Agent, or Firm* — NSIP Law (57) ABSTRACT

A method for providing an omnidirectional image of the surroundings of a vehicle including distance information comprises a plurality of mono cameras placed at different positions of a vehicle's obtaining a plurality of images with different field of views; an image processing device disposed in the vehicle's combining the plurality of images into an omnidirectional image showing the surroundings of the vehicle; the image processing device's selecting two images with overlapping regions from among the plurality of images and generating a stereo image for the overlapping region by using the two images; a display device disposed in the vehicle displaying an omnidirectional image and displaying information about objects recognized through the stereo image.

5 Claims, 7 Drawing Sheets

(56) References Cited

U.S. PATENT DOCUMENTS

2015/0317914 A1* 11/2015 Wohlert ............... G09B 21/006
                                                       340/4.14
2017/0253236 A1*  9/2017 Hayakawa ............ B60W 30/06

* cited by examiner

STEREO IMAGE GENERATING METHOD USING MONO CAMERAS IN VEHICLE AND PROVIDING METHOD FOR OMNIDIRECTIONAL IMAGE INCLUDING DISTANCE INFORMATION IN VEHICLE

CROSS-REFERENCE TO RELATED APPLICATIONS

This application claims priority to Korean Patent Application No. 10-2016-0033806 filed on 22 Mar. 2016 in Korea, the entire contents of which is hereby incorporated by reference in its entirety.

BACKGROUND OF THE INVENTION

Field of the Invention

The present invention relates to a method for providing distance-based information along with an omnidirectional image around a vehicle using mono cameras disposed in the vehicle.

Related Art

Many recent vehicles are equipped with a driver assistance system capable of providing a driver with various kinds of information gathered from cameras and in-vehicle sensors to assist the driver for safe driving. Examples of the driver assistance system include a system providing a driver with omnidirectional images of the environment around a vehicle by using a plurality of cameras disposed in the vehicle.

PRIOR ART REFERENCE (Patent Application 1) Korean public patent no. 10-2013-0069181

The method for providing an omnidirectional image around a vehicle according to the prior art has a problem that it is difficult for a driver to estimate actual distance from the image.

SUMMARY OF THE INVENTION

Accordingly, an object of the present invention is to address the above-noted and other problems.

A method according to the present invention provides distance information along with an omnidirectional image of the surroundings of a vehicle by using a plurality of cameras capturing images with overlapping regions.

A method for generating a stereo image using a plurality of mono cameras comprises a plurality of mono cameras placed at different positions of a vehicle's obtaining a plurality of images with different field of views; an image processing device disposed in the vehicle's selecting two images with overlapping regions from among the plurality of images; and generating a stereo image for the overlapping region by using the two images.

A method for providing an omnidirectional image of the surroundings of a vehicle including distance information comprises a plurality of mono cameras placed at different positions of a vehicle's obtaining a plurality of images with different field of views; an image processing device disposed in the vehicle's combining the plurality of images into an omnidirectional image showing the surroundings of the vehicle; the image processing device's selecting two images with overlapping regions from among the plurality of images and generating a stereo image for the overlapping region by using the two images; a display device disposed in the vehicle displaying an omnidirectional image and displaying information about objects recognized through the stereo image.

Not relying on a separate device such as an infrared sensor, a method according to the present invention provides information based on distance to a driver by using a conventional camera capturing an image of the surroundings of a vehicle. Through the method, the driver may drive the vehicle more safely by using the distance information provided together with omnidirectional images about the environment around the vehicle.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DESCRIPTION OF EXEMPLARY EMBODIMENTS

The method according to the present invention may be modified in various ways and may have various embodiments, which will be described in detail with reference to specific embodiments. However, the present invention is not limited to specific embodiments, but it should be understood that the present invention may be extended to include all of modifications, equivalents, or substitutes of the specific embodiments implementing the technical principles and belonging to the technical scope of the present invention.

The terms such as first, second, A, and B may be used to describe various constituting elements; the terms used do not limit the implications of the corresponding constituting elements but are used only to distinguish one constituting element for the others. For example, while not departing from the technical scope of the present invention, a first constituting element may be denoted as a second constituting element and vice versa. The term and/or is used to indicate a combination of a plurality of related items or one of a plurality of related items.

Unless explicitly interpreted otherwise, a singular expression of a term used in this document should be understood to include a plural expression. And the term "include" simply indicates existence of embodied characteristics, number, steps, operations, constituting elements, parts, or a combination thereof but should be understood not to exclude existence of or possibility of adding one or more other characteristics, number, steps, operations, constituting elements, parts, or a combination thereof.

Before giving detailed descriptions of appended drawings, it should be clarified that distinction of building blocks of the present invention has been made only in terms of the primary functions of the building blocks. In other words, two or more building blocks to be described later may be merged into a single building block, or one building block may be divided into two or more sub-blocks according to their specific functions. Also, each individual building block to be described later may perform not only its main function but also part or all of the functions performed by other building block. Similarly, part of the main function performed by each individual building block may also be performed entirely by a different building block.

In performing a method or operating method, operating steps comprising the method may be performed in an order different from a specific order unless otherwise explicitly indicated according to specific context. In other words, the individual steps may be performed according to the specific context or performed actually at the same time or performed in the opposite order.

Many recent vehicles are equipped with various electronic devices. Examples include electronic braking system (for example, ESP, EBD, EMB, EWB, and BBW), electric steering system (for example, PEPS, REPS, CEPS, AFS, and SBW), electric suspension system (for example, EDC, ASG, ASS, and SBW), integrated chassis control system (for example, ADAS, UCC, and VDM), and driving characteristic measurement sensors (yaw rate sensor, G-sensor, I-tire, and so on).

Also, for the convenience or stability of driving, various devices are being developed actively. Such devices are called DAS (Driver Assistance System) or ADAS (Advanced Driver Assistance System). The DAS collects specific information by using radar, lidar, CMOS cameras, or ultrasonic sensors. The DAS analyzes collected information, detects objects in the surroundings of a vehicle (things, roads, or people), classifies and/or tracks the detected objects.

In the following, a few examples of the DAS are given. (1) An ACC (Adaptive Cruise Control) system is intended to keep a vehicle to drive at a preset speed while keeping a predetermined distance from vehicles ahead. The ACC system monitors the driving route in front of a vehicle by using various sensors such as radar and lidar, detects other vehicles ahead, and maintains a predetermined distance from the vehicles according to the needs of the driver. The ACC system delivers measurement information to other chassis system which controls acceleration and braking of the vehicle. (2) An LDW (Lane Departure Warning) system detects the lane using sensors installed in the vehicle and warns the driver when the vehicle beings to move out of its current lane against the intention of the driver. An LDW system requires an image recognition algorithm to detect lanes and uses cameras or infrared sensors. (3) A BSD (Blind Spot Detection) system alerts the driver when other vehicles are located in the blind area to the left or right side of a vehicle. A BSD system uses radar, CMOS sensor, or infrared sensors. (4) Furthermore, another example of the DAS provides the driver with an image of the surroundings of a vehicle when the vehicle drives at a predetermined (low) speed. It is a so-called around view system or surround view system. In what follows, it is called an around view system collectively. An around view system is mainly used to show existence of obstacles around a vehicle when the vehicle moves at a low speed in a driving situation such as parking or stopping the vehicle.

An around view system displays omnidirectional images of the environment around a vehicle obtained from cameras installed around the vehicle through a display device inside the vehicle. For most cases, an around view system provides top-down view omnidirectional images. However, existing around view systems provides omnidirectional images only but do not provide information about objects in the vicinity of the vehicle or distance information. Thus the vehicle uses a separate sensor to give an alarm for objects that may collide with the vehicle.

The technique to be described later relates to a method for generating stereo images by using a plurality of mono cameras used for an around view system. Furthermore, the technique to be described later may be used to generate stereo images by using cameras used for other chassis systems in addition to the cameras for the around view system. Also, the technique to be described later relates to a method for detecting objects or providing distance information by using the generated stereo images. In what follows, the technique employs ordinary mono cameras rather than stereo cameras. The technique employs a plurality of mono cameras and generates stereo images by using overlapping regions from among the images obtained from the cameras. In what follows, cameras refer to mono cameras.

Figure 1:
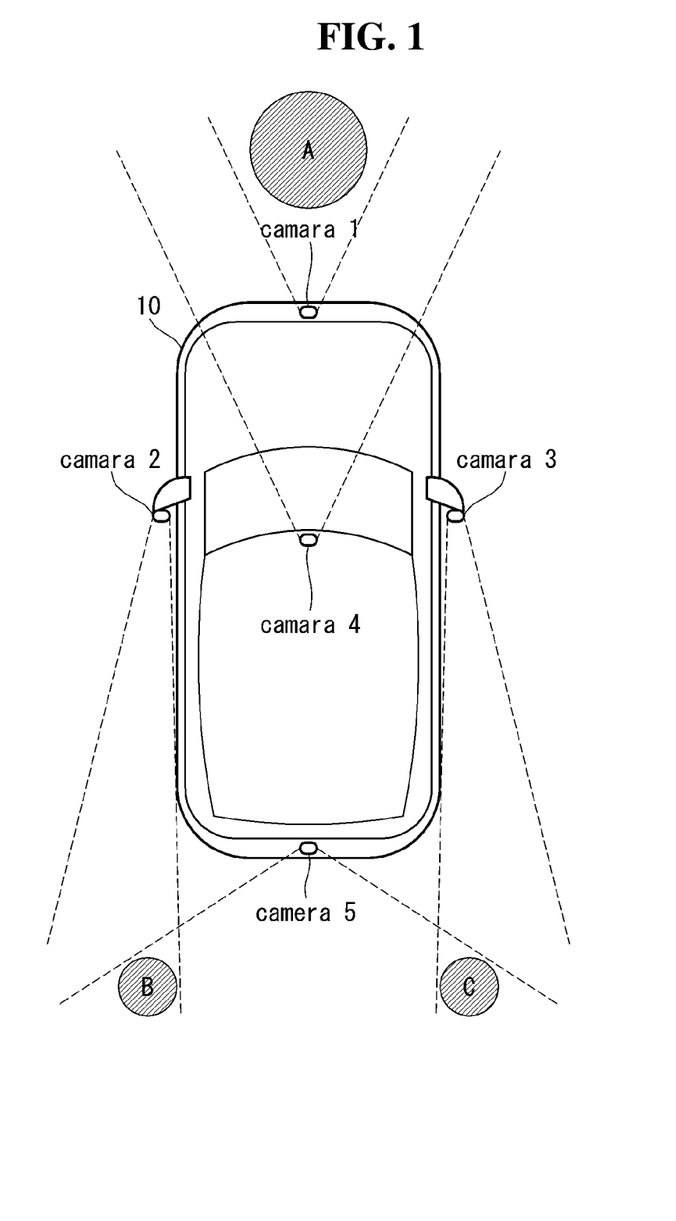
FIG. 1 illustrates an example in which cameras disposed in a vehicle obtain images with overlapping field of views.

First, provided is an example where cameras disposed around a vehicle captures images overlapping with each other. FIG. 1 illustrates an example in which cameras disposed in a vehicle 10 obtain images with overlapping field of views. FIG. 1 is one example in which a plurality of cameras are disposed in the vehicle 10. Camera 1 is disposed at the front of the vehicle 10 and obtains front view images. Camera 2, being disposed at the left-side mirror of the vehicle 10, captures rear view images. Camera 3, being disposed at the right-side mirror of the vehicle 10, captures rear view images. Camera 4 is disposed at the top of the vehicle 10 and captures the front view images. Camera 5 is disposed at the rear of the vehicle 10 and captures rear view images.

While capturing the scene in the front of a vehicle 10, the camera 1 and camera 4 may obtain an image of the overlapping region A. While capturing the scene in the rear of the vehicle 10, the camera 2 and the camera 5 may obtain an image of the overlapping region B. Similarly, camera 2 and camera 3 may obtain an image of the overlapping region C while capturing the scene in the rear of the vehicle 10.

Figure 2:
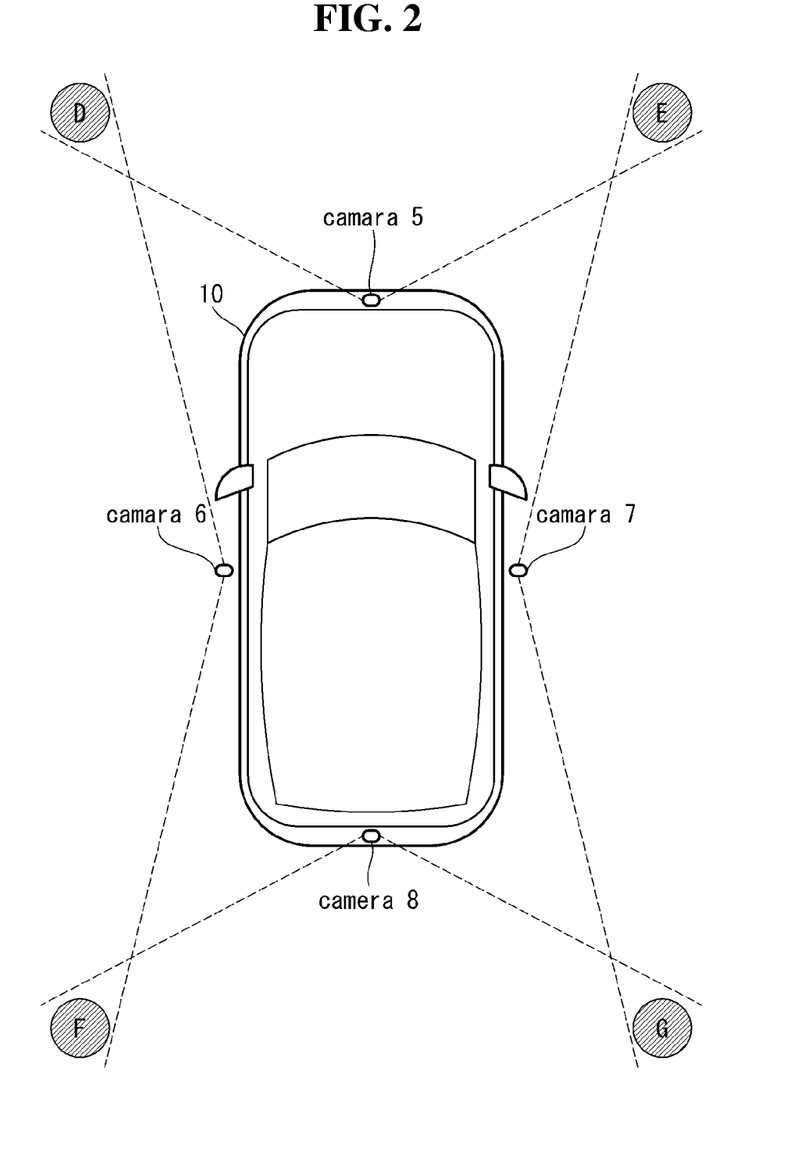
FIG. 2 illustrates another example in which cameras disposed in a vehicle obtain images with overlapping field of views.

FIG. 2 illustrates another example in which cameras disposed in a vehicle obtain images with overlapping field of views. The camera 5 is disposed at the front of the vehicle 10 and obtains images of the scene in front of the vehicle. The camera 6 is disposed at the left side of the vehicle 10 and obtains images of the scene in the left side of the vehicle 10. The camera 7 is disposed in the right side of the vehicle 10 and obtains images of the scene in the right side of the vehicle 10. The camera 8 is disposed in the rear of the vehicle 10 and obtains images of the scene in the rear of the vehicle 10.

The camera 5 and the camera 6 may obtain the image of the overlapping region D. The camera 5 and the camera 7 may obtain the image of the overlapping region E. The camera 6 and the camera 8 may obtain the image of the overlapping region F. Similarly, the camera 7 and the camera 8 may obtain the image of the overlapping region G.

It should be noted that different from the cases of FIGS. 1 and 2, cameras may be placed at various positions of the vehicle 10. Also, overlapping regions of the cameras may be formed in various ways from different geometric configurations of the cameras. In case two or more mono cameras are used to obtain images of the overlapping regions, stereo images for the overlapping region may be generated through appropriate image processing.

Figure 3:
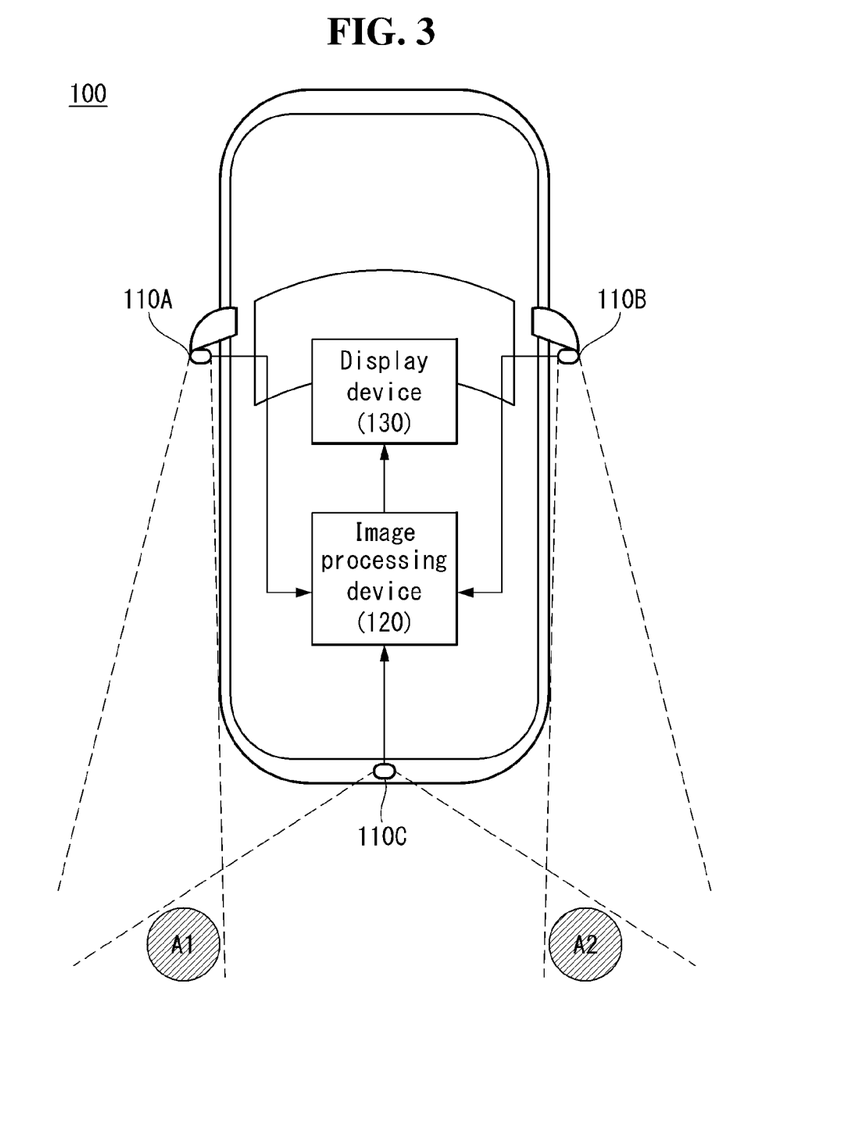
FIG. 3 illustrates an example of a system providing omnidirectional images of the environment around a vehicle.

FIG. 3 illustrates an example of a system 100 providing omnidirectional images of the environment around a vehicle. The system 100 providing omnidirectional images of the environment around a vehicle provides a driver with omnidirectional images of the scene around the vehicle by using a plurality of mono cameras.

The omnidirectional imaging system 100 of the vehicle comprises three cameras 110A, 110B, and 110C, image processing device 120, and display device 130. FIG. 3 illustrates three cameras 110A, 110B, and 110C for the convenience of descriptions. Different from the specific example of FIG. 3, the system 100 providing omnidirectional images of the environment around the vehicle may employ cameras placed at various positions. However, a geometric constraint on the disposition of the cameras is that at least two cameras are disposed so as to obtain images of an overlapping region.

The camera 110A is disposed at the left-side mirror of the vehicle and obtains images of the rear scene of the vehicle. The camera 110B is disposed at the right-side mirror of the vehicle and obtains images of the rear scene of the vehicle. The camera 110C is disposed at the rear of the vehicle and obtains images of the rear scene of the vehicle. The camera 110A and the camera 110C may obtain an image of the overlapping region A1. The camera 110B and the camera 110C may obtain an image of the overlapping region A2.

The image processing device 120 processes the images captured by the cameras 110A, 110B, and 110C according to a predetermined process. The image processing device 120 may display the images captured by the respective cameras 110A, 110B, and 110C on the display device 130. The image processing device 120 may process the images captured by the respective cameras 110A, 110B, and 110C according to a predetermined process and convert the omnidirectional images of the surroundings of the vehicles into a top-down view image to be displayed on the display device 130. The image processing device 120 may employ a multitude of methods to process the captured images, and the processed images may also be displayed on the display device 130 in various forms. Furthermore, the image processing device 120 may generate a stereo image for the overlapping region A1 to A2.

The display device 130 receives image data from the image processing device 120 and outputs an image in a predetermined fashion. The display device 130 may use a dedicated device for displaying omnidirectional images of the surroundings of the vehicle. Also, an in-vehicle infotainment system which provides various kinds of information may employ the display device 130.

Figure 4:
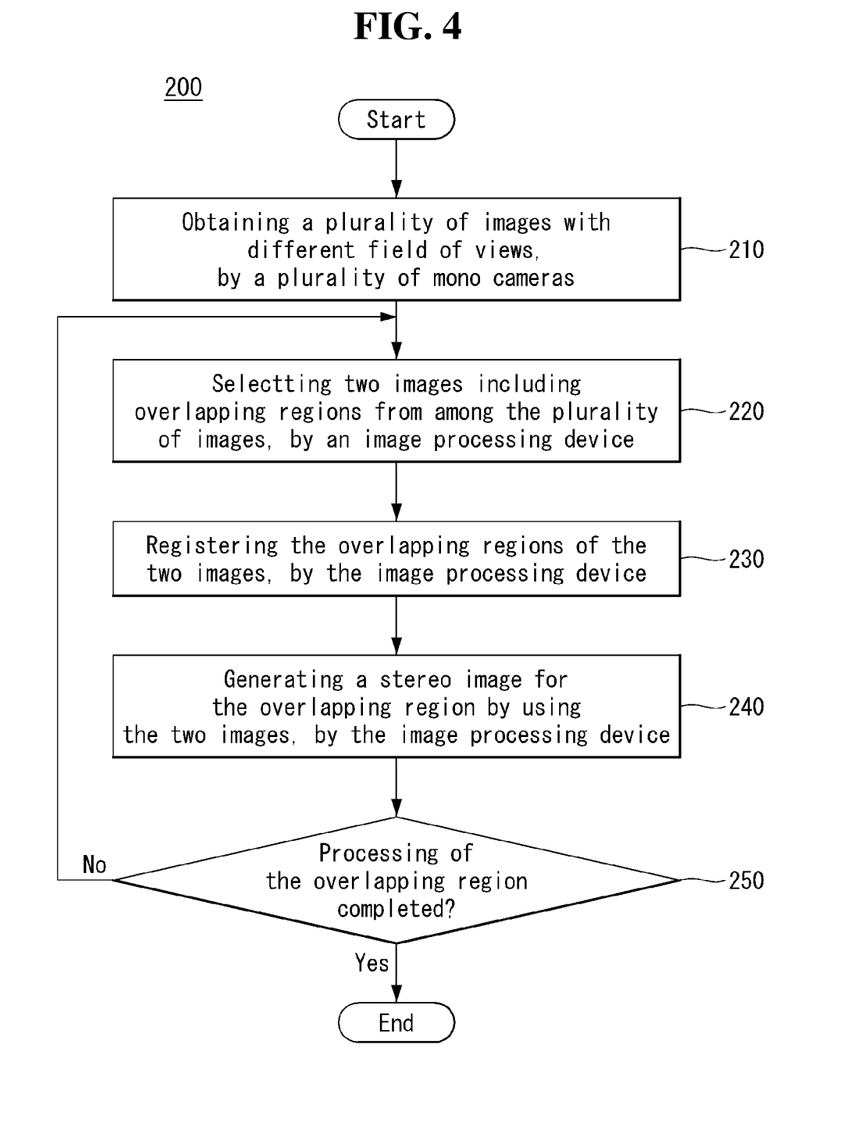
FIG. 4 is a flow diagram of a method for generating a stereo image using a plurality of mono cameras in a vehicle.

In what follows, a method for the image processing device 120 to generate stereo images will be described. FIG. 4 is a flow diagram of a method 200 for generating a stereo image using a plurality of mono cameras in a vehicle.

A plurality of mono cameras 110A, 110B, and 110C obtain images with different field of views in real time 210. The image processing device 120 selects two images which includes an overlapping region from among the obtained images 220. For example, the image processing device 120 may select the image of the overlapping region A1 captured by both of the two cameras 110A and 110C.

The image processing device 120 performs image registration for the overlapping region found in both of the images captured by the two cameras 110A and 110C, 230. As shown in FIG. 3, camera positions differ from each other. Therefore, even if cameras having the same specifications are used, each camera obtains an image with a different viewpoint from the other. Also, even if the cameras 110A and 110C have the same specification and are configured with the same image capture setting, an object captured by the two cameras 110A and 110C may occupy different image areas in the respective image frames of the same size. As a result, the image processing device 120 has to perform image registration on the overlapping region (for example, A1) as if a stereo camera has taken the image of the overlapping region.

Furthermore, in case hardware performance and setting is different for each camera, it is preferable to convert the respective images into the images of the same specification. For example, the image processing device 120 may perform preprocessing on an image by taking into account the camera setting such as zoom setting and image resolution. Also, the image processing device 120 may process the difference of image brightness due to ambient lighting conditions in a uniform manner.

Finally, the image processing device 120 generates a stereo image by using two images of the overlapping region (for example, A1) 240. Conventional techniques in the corresponding technical field may be employed to generate a stereo image using two images.

The image processing device 120 determines whether the overlapping region has been processed completely 250; if not, the image processing device 120 generates a stereo image for another overlapping region (for example, A2). Meanwhile, different from FIG. 4, the image processing device 120 may generate stereo images of overlapping regions in a parallel fashion depending on the hardware configuration of the image processing device 120.

A stereo image basically provides distance information about an object in the image. The vehicle may provide the driver with additional information by using the method 200 for generating a stereo image described with reference to FIG. 4. For example, an around view system may provide information about objects located in the vicinity of the vehicle or distance information about the objects along with an omnidirectional image of the surroundings of the vehicle.

Figure 5:
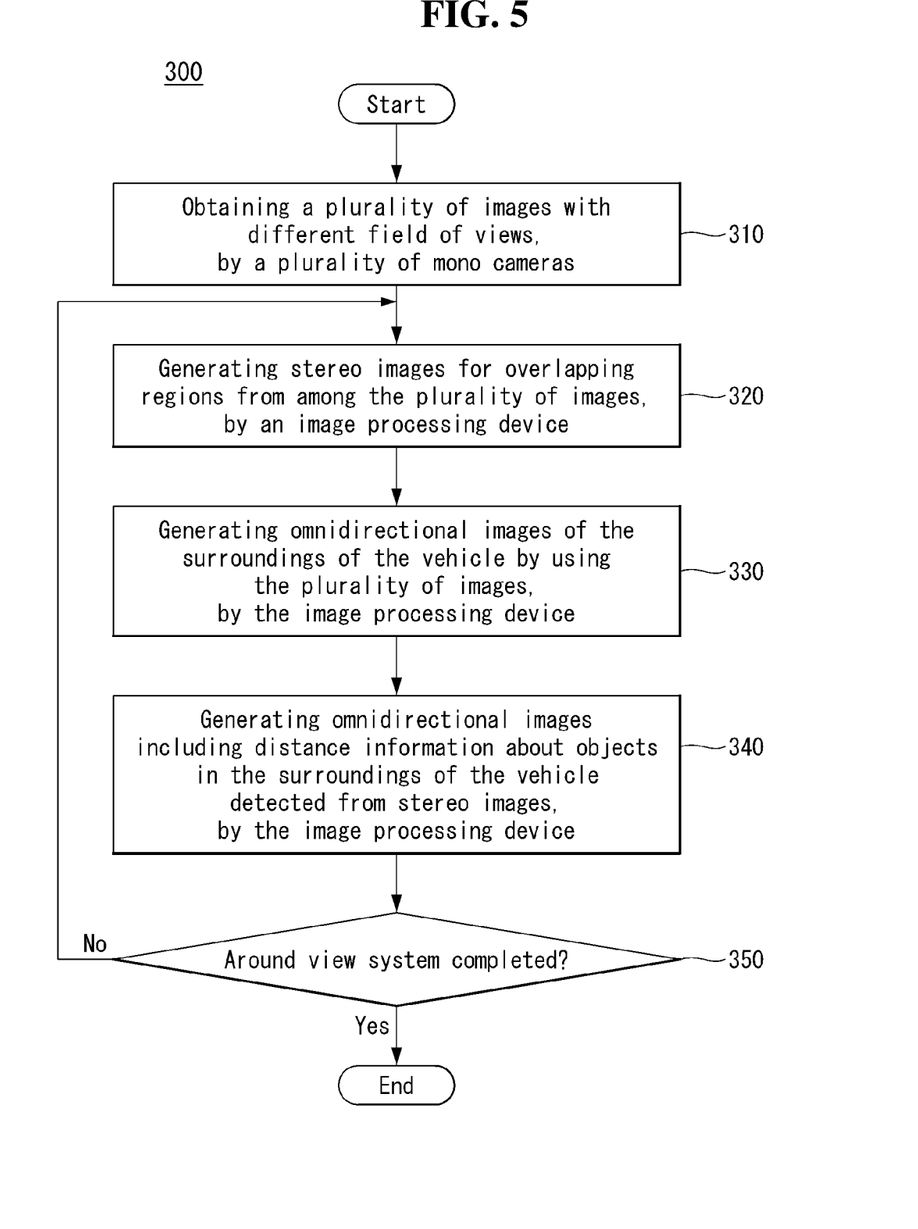
FIG. 5 is a flow diagram of a method for providing omnidirectional images including distance information in a vehicle.

FIG. 5 is a flow diagram of a method 300 for providing omnidirectional images including distance information in a vehicle. FIG. 5 illustrates an example in which an around view system provides distance information along with an omnidirectional image.

A plurality of mono cameras 110A, 110B, and 110C obtains in real-time images captured at different viewpoints 310. The image processing device 120 generates a stereo image of the overlapping region (A1 and A2) from among a plurality of images 320. The process 320 for generating a stereo image is the same as described with reference to FIG. 4.

The image processing device 120 processes the images obtained by the respective cameras 110A, 110B, and 110C according to a predetermined process and generates an omnidirectional image (around view image) 330. The image processing device 120 may process the images captured by the cameras 110A, 110B, and 110C into a single composite top-down view image as if seen from above the vehicle. The image processing device 120 may stitch overlapping image regions acquired by two cameras in a uniform fashion to provide a more natural 360-degree surround view image.

Using a stereo image, the image processing device 120 may estimate the distance to the object belonging to the image. Furthermore, the image processing device 120 may detect a particular object from the stereo image. For example, by using the stereo image, the image processing device 120 may detect objects such as obstacles, other vehicles, and people in the vicinity of the vehicle more easily.

The image processing device 120 may include information about objects or distance information detected from the stereo image in the basic omnidirectional image of the environment around the vehicle. In this case, the display device 130 displays an around view image on which object information or distance information is augmented.

If the around view system is not completed (No in the step 350), the image processing device 120 repeats the same process.

Figure 6A:
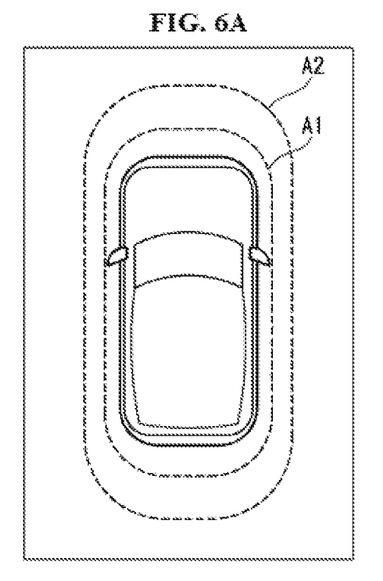
FIGS. 6A-6C illustrate examples in which a display device of a vehicle displays an omnidirectional image including distance information.
Figure 6B:
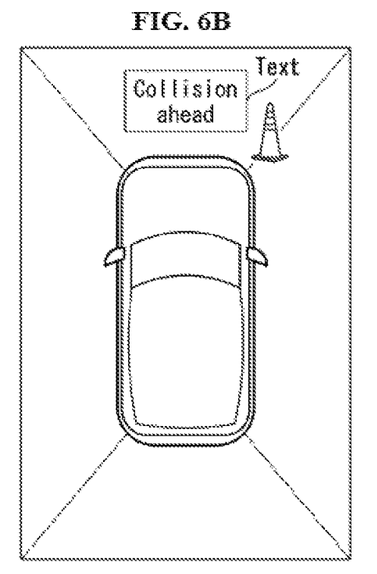
Figure 6C:
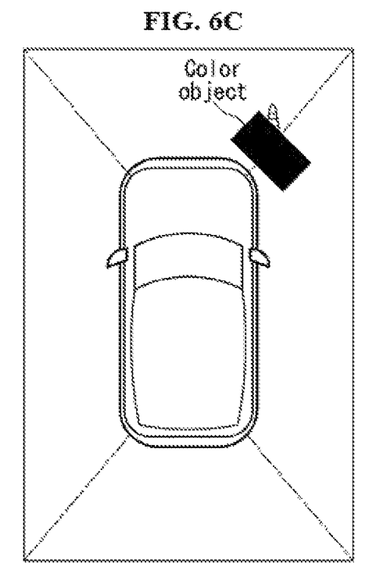

FIGS. 6A-6C illustrate examples in which a display device of a vehicle displays an omnidirectional image including distance information. FIG. 6A shows an example in which the display device of a vehicle displays distance information from the vehicle on the screen while displaying an omnidirectional image of the surroundings of the vehicle (around view image). For example, the dotted line denoted as A1 indicates the boundary separated by 30 cm from the outermost part of the vehicle while the dotted line denoted as A2 indicates the boundary separated by 50 cm from the outermost part of the vehicle. In this way, if the display device shows an object indicating a predetermined distance from the vehicle, the driver may easily recognize the distance from the vehicle to the object displayed on the screen.

FIG. 6B illustrates an example in which the display device alerts the driver for an object approaching the vehicle within a predetermined distance by using a text message. If there are changes that the vehicle may collide with an obstacle, the display device may alert the corresponding emerging collision in the form of text. For example, if the distance from the vehicle to an obstacle is less than 1 m, an alarm may be displayed. Furthermore, a reference distance which may trigger an alarm may be set in advance differently for each type of object. In the case of a moving object such as a human or a nearby vehicle, it is preferable to alert the driver to the emerging risk of collision at a sufficiently long distance to the object. The image processing device may detect an object from the stereo image and identify the specific object detected.

FIG. 6C illustrates an example in which an object entering the region within a reference distance from the vehicle is indicated in the omnidirectional image of the surroundings of the vehicle by an object of specific color. FIG. 6C displays an object entering the region within a reference distance as a red rectangular. The object entering the region within a reference distance may be displayed in various other forms of graphic objects. Similarly, the display device may blink the entire screen or display the object in a different color. Furthermore, the vehicle may produce a predetermined warning sound through a speaker independently of the screen display of the display device.

The cameras used for generating stereo images may belong to different chassis systems. In other words, the image processing device may generate a stereo image by using the images obtained by a plurality of cameras (image sensors) used in a different chassis system rather than the around view system. Similarly, the image processing device may generate a stereo image by using all of the cameras used in the around view system and other chassis systems.

Figure 7:
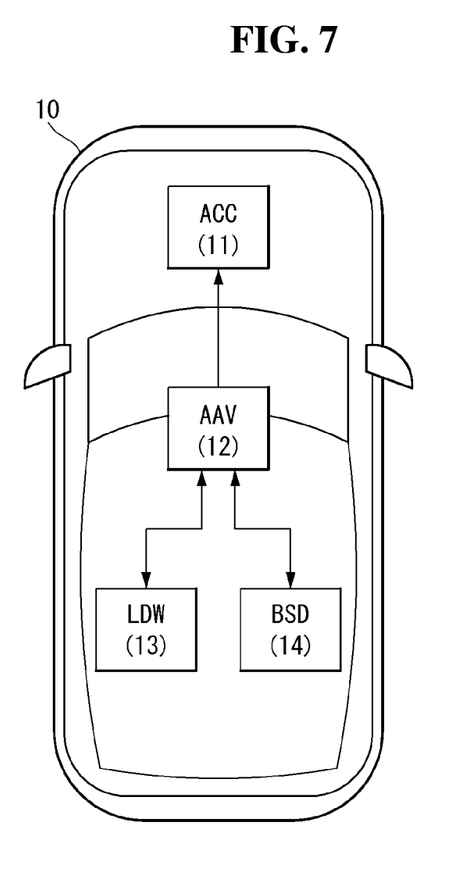
FIG. 7 illustrates an example in which information is delivered in a chassis system.

FIG. 7 illustrates an example in which information is delivered in a chassis system. FIG. 7 shows an ACC system 11, AAV system 12, LDW system 13, and BSD system 14 among those systems installed in the vehicle 10. The AAV (Advanced Around View) system 120 refers to the system which provides an omnidirectional image including distance information described in FIGS. 5 and 6.

In general, an LDW system 13 and a BSD system 14 employ cameras. The AAV system 12 may receive predetermined image information from the LDW system 13 and/or BSD system 14. The AAV system 12 may generate a stereo image by using the overlapping region of the received images.

Furthermore, the AAV system 12 may deliver the distance information of a particular object obtained from the corresponding stereo image to other chassis system. (1) The AAV system 12 may deliver the distance information of an object located in front of the vehicle to the ACC system 11. The ACC system 11 usually recognizes other vehicles located ahead of the vehicle using a lidar. Furthermore, the ACC system 11 may perform more precise vehicle control by additionally using the distance information of the objects delivered from the AAV system 12. (2) The AAV system 12 may deliver the distance information of an object located in the blind area of the vehicle to the BSD system 14. The BSD system 14 informs the driver of other vehicles or objects passing the blind area by using radar, CMOS sensor, or infrared sensor. The BSD system 14 may provide the driver with more accurate information by additionally using the distance information of the objects delivered from the AAV system 12.

The present embodiments and figures accompanying the present document are intended merely to clarify part of the technical principles underlying the techniques described above. Therefore, it should be clearly understood that various modifications of the present invention which may be derived easily by those skilled in the art within the technical principles included in the technical specification and drawings described above and specific embodiments of the present invention all belong to the technical scope described above.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A method for generating a stereo image using a plurality of mono cameras in a vehicle, comprising:
   obtaining a plurality of images with different field of views, by a plurality of mono cameras placed at different positions on a vehicle;
   selecting two images including an overlapping region from among the plurality of images, by an image processing device disposed in the vehicle;
   registering the overlapping region(s) of the two images, by the image processing device;
   generating a stereo image for the overlapping region by using the two images, by the image processing device; and
   displaying images obtained by the plurality of mono cameras, by a display device inside the vehicle,
   wherein the processing device is configured to detect distance information about objects in the stereo image,
   wherein the display device additionally displays distance information about objects detected from the stereo image and/or alarm information about the objects,
   wherein the display device displays the alarm information when an object is detected within a threshold distance of the vehicle, and
   wherein the threshold distance is different for each type of object,
   wherein the processing device is further configured to generate a single composite top-down view image, as if seen from above the vehicle, by using the stereo image and the distance information.

2. The method of claim 1, wherein the plurality of mono cameras comprise two cameras obtaining images of the scene in front of the vehicle; a first camera obtaining images of the scene in front of the vehicle and a second camera obtaining images of the scene on the side of the vehicle; and a first camera obtaining images of the scene in the rear of the vehicle and a second camera obtaining images of the scene on the side of the vehicle or at least one of two cameras obtaining images of the scene in the rear of the vehicle.

3. The method of claim 1, wherein the image processing device delivers information about the objects located within a reference distance to a DAS (Driver Assistance System) of the vehicle.

4. A method for providing an omnidirectional image of the surroundings of a vehicle including distance information, comprising:
   obtaining a plurality of images with different field of views; an image processing device disposed in the vehicle combining the plurality of images into an omnidirectional image showing the surroundings of the vehicle, by a plurality of mono cameras placed at different positions on a vehicle;
   selecting two images including an overlapping region from among the plurality of images;
   registering the overlapping region of the two images, by the image processing device;
   generating a stereo image for the overlapping region by using the two images, by the image processing device, and information indicating a distance to the objects, by a display device disposed in the vehicle,
   wherein the information includes information indicating type of the object and/or information indicating whether the object is located within a reference distance, and
   wherein the reference distance is different for each type of object,
   wherein the processing device is further configured to generate a single composite top-down view image, as if seen from above the vehicle, by using the stereo image and the distance information.

5. The method of claim 4, wherein the plurality of mono cameras comprise two cameras obtaining images of the scene in front of the vehicle; a first camera obtaining images of the scene in front of the vehicle and a second camera obtaining images of the scene on the side of the vehicle; and a first camera obtaining images of the scene in the rear of the vehicle and a second camera obtaining images of the scene on the side of the vehicle or at least one of two cameras obtaining images of the scene in the rear of the vehicle.

* * * * *